(12) United States Patent
Fukino (10) Patent No.: US 7,990,626 B2
(45) Date of Patent: Aug. 2, 2011

(54) LENS BARREL AND IMAGE CAPTURING APPARATUS

(75) Inventor: Kunihiro Fukino, Fujisawa (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 12/709,940

(22) Filed: Feb. 22, 2010

(65) Prior Publication Data

US 2010/0214671 A1  Aug. 26, 2010

(30) Foreign Application Priority Data

Feb. 24, 2009  (JP) ................ 2009-041409

(51) Int. Cl.
*G02B 15/14*  (2006.01)
(52) U.S. Cl. .......... 359/700; 359/702; 359/704
(58) Field of Classification Search .......... 359/694–704, 359/819–824
See application file for complete search history.

(56) References Cited

U.S. PATENT DOCUMENTS

| 4,805,991 | A | * | 2/1989 | Arai et al. ........... 359/824 |
| 4,925,282 | A | * | 5/1990 | Kanno et al. ........ 359/698 |
| 5,523,892 | A | * | 6/1996 | Yoshibe et al. ...... 359/819 |
| 5,539,583 | A | * | 7/1996 | Watanabe et al. ... 359/699 |
| 7,038,859 | B2 | * | 5/2006 | Tsuzuki ............... 359/704 |

FOREIGN PATENT DOCUMENTS

JP    A-2000-089086    3/2000

* cited by examiner

*Primary Examiner* — Mohammed Hasan
(74) *Attorney, Agent, or Firm* — Oliff & Berridge, PLC (57) ABSTRACT

Provided is a lens barrel comprising: an optical system including an optical component that moves relative to a fixed cylinder; a holding frame that holds the optical component; a guide axle that is connected to the holding frame and that extends in a direction parallel to an optical axis of the optical system; a scaling drive unit that can move relative to the fixed cylinder and that moves the holding frame in the direction of the optical axis when the optical system scales; and a focusing drive unit that has at least a portion thereof fixed to the fixed cylinder and that moves the guide axle in the direction of the optical axis while facing at least a portion of the guide axle.

16 Claims, 5 Drawing Sheets

LENS BARREL AND IMAGE CAPTURING APPARATUS

BACKGROUND

1. Technical Field

The present invention relates to a lens barrel and an image capturing apparatus.

The present application claims priority from Japanese Patent Application No. 2009-41409 filed on Feb. 24, 2009, the contents of which are incorporated herein by reference.

2. Related Art

Japanese Patent Application Publication No. 2000-089086 discloses a configuration of an internal focusing zoom lens in which the scaling of an optical system is changed by changing the intervals between a plurality of lenses therein and the focal position of this optical system is changed by moving intermediate lenses therein.

However, this requires a complicated configuration with many components and there are many steps to the assembly, and it is therefore unsuitable for mass production. Furthermore, the ability of the lens barrel is greatly impacted by the accuracy of the components, the precision of the assembly, and the like, which means that improving the ability of the lens barrel incurs a high cost.

SUMMARY

According to a first aspect related to the innovations herein, one exemplary lens barrel may comprise: an optical system including an optical component that moves relative to a fixed cylinder; a holding frame that holds the optical component; a guide axle that is connected to the holding frame and that extends in a direction parallel to an optical axis of the optical system; a scaling drive unit that can move relative to the fixed cylinder and that moves the holding frame in the direction of the optical axis when the optical system scales; and a focusing drive unit that has at least a portion thereof fixed to the fixed cylinder and that moves the guide axle in the direction of the optical axis while facing at least a portion of the guide axle.

The summary clause does not necessarily describe all necessary features of the embodiments of the present invention. The present invention may also be a sub-combination of the features described above. The above and other features and advantages of the present invention will become more apparent from the following description of the embodiments taken in conjunction with the accompanying drawings.

DESCRIPTION OF EXEMPLARY EMBODIMENTS

Hereinafter, some embodiments of the present invention will be described. The embodiments do not limit the invention according to the claims, and all the combinations of the features described in the embodiments are not necessarily essential to means provided by aspects of the invention.

Figure 1:
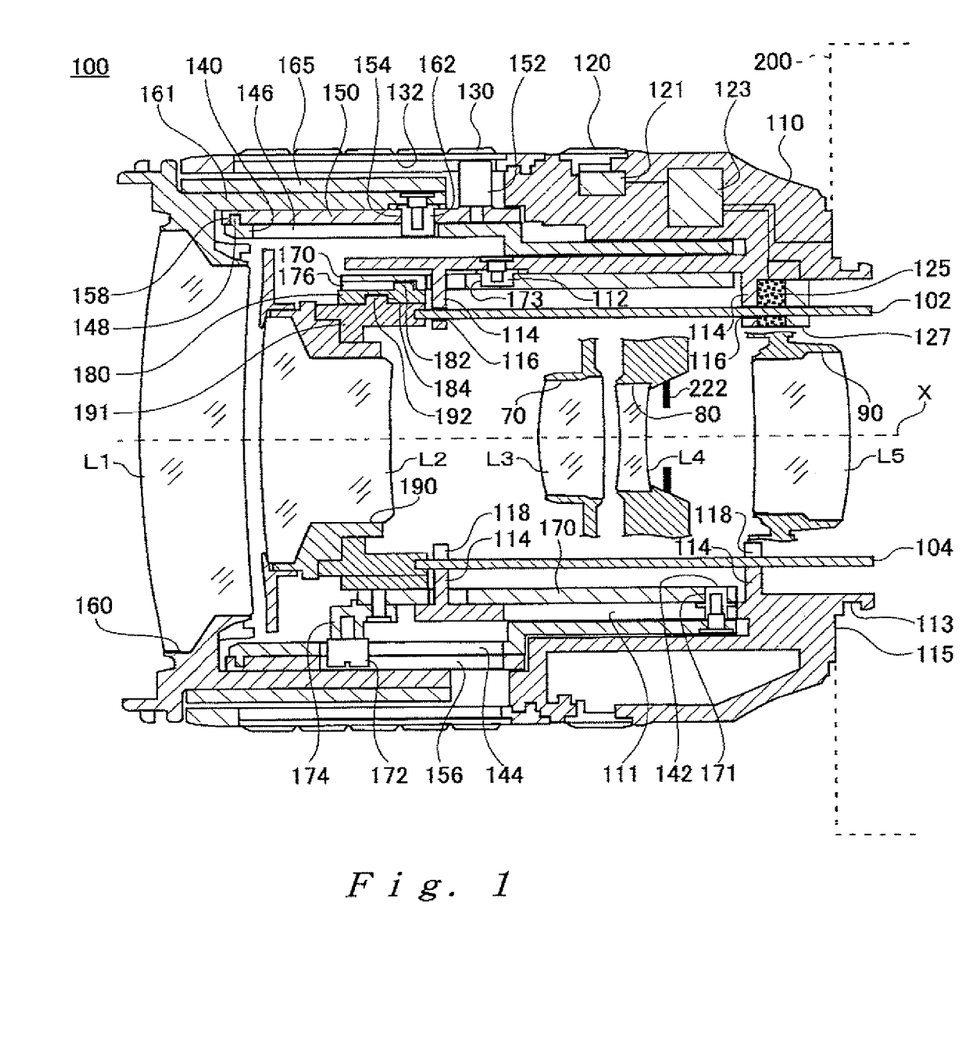
FIG. 1 is a cross-sectional view of a lens barrel 100 scaled as a wide angle lens.

FIG. 1 is a cross-sectional view of a lens barrel 100. The lens barrel 100 is provided with five lenses L1, L2, L3, L4, and L5 arranged in order on a common optical axis X. The lenses L1 to L5 are held respectively by lens frames 160, 190, 70, 80, and 90.

This lens barrel 100 is an internal focusing zoom lens, and FIG. 1 shows the lens barrel 100 in a wide angle state. The lens frame 80 holding the lens L4 also holds a diaphragm apparatus that changes the diameter of the optical path of the optical system including the lens L4.

The lens barrel 100 includes a fixed cylinder 110 that is fixed to an image capturing unit 200 having an image sensor or the like. An inner cylinder 140, a middle cylinder 150, an outer cylinder 161, and a zoom ring 130 are arranged in the stated order, beginning with the innermost, in the outer periphery of the front end of the fixed cylinder 110.

A cam cylinder 170 that is rotatable relative to the fixed cylinder 110 is arranged on an inner side of the fixed cylinder 110. A transfer ring 180 oriented on the same axis as the fixed cylinder 110 and a pair of guide bars 102 and 104 oriented parallel to the optical axis are arranged on the inner side of the cam cylinder 170.

The fixed cylinder 110 has a linear groove 111, a cam pin 112, a mount 113, and support sections 114. The linear groove 111 extends in the direction of the optical axis X of the lens barrel 100. The cam pin 112 protrudes radially inward from an inner peripheral surface of the fixed cylinder 110, and engages with a cam groove 173 of the cam cylinder 170 described further below.

The mount 113 is arranged on the rear end of the lens barrel 100, which is the right end of FIG. 1. By engaging the mount 113 with the image capturing unit 200, the fixed cylinder 110 is fixed to the image capturing unit 200. In the fixed cylinder 110 fixed to the image capturing unit 200, the mount surface 115 at the rear end of the fixed cylinder 110 closely contacts the front surface of the image capturing unit 200. As a result, the position of the entire lens barrel 100 can be fixed relative to the image capturing unit 200.

The support sections 114 protrude radially inward from the inner peripheral surface of the fixed cylinder 110 and support the guide bars 102 and 104. The support sections 114 supporting the guide bar 102 arranged on the upper side of FIG. 1 each have a fitting hole 116 whose shape complements the shape of the outer periphery of the guide bar 102. The guide bar 102 is supported by being inserted through the fitting holes 116. As a result, the guide bar 102 is allowed to move in the direction of the optical axis X while displacement in any other direction is prevented.

The support sections 114 supporting the guide bar 104 arranged on the lower side of FIG. 1 each have a U-shaped groove 118 with parallel surfaces having an interval therebetween equal to the diameter of the guide bar 104. The guide bar 104 is inserted through the U-shaped grooves 118, and is thereby allowed to move in the direction of the optical axis X while being prevented from moving in a direction orthogonal to the optical axis X.

As described further below, the pair of guide bars 102 and 104 are fixed to the connector 191, and therefore the lens frame 190 moves integrally with the connector 191. As a result, the guide bars 102 and 104 work together to guide the lens frame 190 holding the lens L2 when the lens frame 190 moves in the direction of the optical axis X. The guide bar 104 prevents the lens L2 held by the lens frame 190 from rotating around the guide bar 102.

The inner cylinder 140 has a cam follower 142, a recessed hole 144, a linear groove 146, and an engaging protrusion 148. The cam follower 142 is positioned near a rear end of the inner cylinder 140 and protrudes radially inward to the lens barrel 100. The linear groove 146 extends in the direction of the optical axis X of the lens barrel 100. The engaging protrusion 148 protrudes outward in a radial direction of the lens barrel 100.

The cam follower 142 passes through the linear groove 111 to engage with the cam groove 171 of the cam cylinder 170, described further below. As a result, the inner cylinder 140 is prevented from rotating around the optical axis X when the cam cylinder 170 rotates. Furthermore, the drive force that moves the inner cylinder 140 in the direction of the optical axis X is transmitted from the cam groove 171 to the cam follower 142.

The recessed hole 144 is arranged at a different position than the linear groove 146 in the circumferential direction of the lens barrel 100. The cam follower 172 of the cam cylinder 170, described further below, is inserted through the recessed hole 144.

The middle cylinder 150 has a cam follower 152, a cam groove 154, a linear groove 156, and an engaging groove 158. The cam follower 152 protrudes outward in a radial direction of the lens barrel 100, and engages with the guide groove 132 of the zoom ring 130. The cam groove 154 extends diagonally relative to the optical axis X.

The linear groove 156 is arranged at a different position than the cam groove 154 in the circumferential direction of the lens barrel 100. The linear groove 156 extends in the direction of the optical axis X, and engages with the cam follower 172 of the cam cylinder 170, described further below.

The engaging groove 158 is formed on the inner peripheral surface of the middle cylinder 150 along a plane orthogonal to the optical axis X. The engaging groove 158 engages with the engaging protrusion 148 of the inner cylinder 140. As a result, the middle cylinder 150 moves integrally with the inner cylinder 140 in the direction of the optical axis, and can rotate independently of the inner cylinder 140 around the optical axis X.

The outer cylinder 161 has a cam follower 162. The cam follower 162 protrudes inward in the radial direction of the lens barrel 100, and engages with the cam groove 154 of the middle cylinder 150 and the linear groove 146 of the inner cylinder 140. As a result, when the middle cylinder 150 rotates around the optical axis X, the cam follower 162 prevents the outer cylinder 161 from rotating around the optical axis X while the drive force in the direction of the optical axis X is transmitted to the outer cylinder 161

The outer cylinder 161 is engaged with the lens frame 160 holding the lens L1. As a result, when the outer cylinder 161 moves in the direction of the optical axis X, the lens L1 also moves along the optical axis X.

The cam cylinder 170 is provided to be rotatable on the inner side of the fixed cylinder 110. The cam cylinder 170 has a plurality of cam grooves 171 and 173, a cam follower 172, and a linear groove 176. The cam grooves 171 and 173 are formed diagonally to the optical axis X. The cam groove 171 engages with the cam follower 142 of the inner cylinder 140. The cam groove 173 engages with the cam pin 112 of the fixed cylinder 110. The linear groove 176 engages with the cam follower 182 of the transfer ring 180, described further below.

The cam follower 172 protrudes radially outward from the connecting member 174 and engages with the linear groove 156 of the middle cylinder 150 through the recessed hole 144 of the inner cylinder 140. Therefore, when the middle cylinder 150 rotates around the optical axis X, the drive force for rotating the cam cylinder 170 is transmitted from the cam follower 172 to the cam cylinder 170.

In order to generate the drive force to move the lens frames 70, 80, and 90 holding the other lenses L3, L4, and L5, the cam cylinder 170 may have further cam grooves that are not shown. In order to decrease the weight, for example, portions of the cam cylinder 170 in which cam grooves are not formed can be removed. Therefore, the cam cylinder 170 is not necessarily a complete cylinder.

The transfer ring 180 is arranged near the fixed cylinder 110 and the front end, i.e. the left side of FIG. 1, of the cam cylinder 170. The transfer ring 180 has a cam follower 182 and a cam groove 184. The cam follower 182 is arranged on the outer peripheral surface of the transfer ring 180 and protrudes radially to engage with the linear groove 176 of the cam cylinder 170. Therefore, when the cam cylinder 170 rotates around the optical axis X, the transfer ring 180 also rotates around the optical axis X. The cam groove 184 is formed on the inner peripheral surface of the transfer ring 180 and is inclined to be neither parallel nor perpendicular to the optical axis X.

The connector 191 has a cam follower 192. The cam follower 192 is arranged on the outer surface of the connector 191 and engages with the cam groove 184 of the transfer ring 180. The connector 191 is fixed to the guide bars 102 and 104 to prevent rotation around the optical axis X.

Therefore, when the transfer ring 180 rotates around the optical axis X, the connector 191 moves in the direction of the optical axis X. The connector 191 is connected integrally with the lens frame 190 holding the lens L2, and so the lens L2 moves when the connector 191 moves.

In the configuration of the above drive mechanism, the cam followers 182 and 192 are desirably arranged near the guide bar 102 in the circumferential direction of the transfer ring 180 or the connector 191. In this way, the drive force received by the cam followers 182 and 192 is efficiently converted the rotation of the transfer ring 180 and movement of the lens L2.

The zoom ring 130 is provided to rotate around the optical axis X along the outer peripheral surface of the fixed cylinder 110. The zoom ring 130 has a guide groove 132 formed on the inner peripheral surface thereof. The guide groove 132 extends in a line parallel to the direction of the optical axis X. The guide groove 132 engages with the cam follower 152 of the middle cylinder 150. Therefore, when the rotation operation is performed on the zoom ring 130, the middle cylinder 150 also rotates around the optical axis X.

A focus ring 120 is arranged behind the zoom ring 130, i.e. to the right in FIG. 1, on the outer peripheral surface of the lens barrel 100. The focus ring 120 rotates around the optical axis X along the outer peripheral surface of the fixed cylinder 110.

A rotation amount detector 121 and a barrel control section 123 are provided on the inner side of the focus ring 120. The rotation amount detector 121 detects a rotation amount of the focus ring 120 rotated by the rotation operation from the outside, and transmits a rotation signal corresponding to the rotation amount. The barrel control section 123 receives the rotation amount signal transmitted by the rotation amount detector 121.

The rotation amount detector 121 may be formed using a rotary scale that rotates together with the focus ring 120 and an optical sensor that measures the rotary scale. As another example, the rotation amount detector 121 may be fanned using a magnet that rotates with the focus ring 120 and a magnetic sensor that measures the change in the magnetic field caused by the movement of the magnet. These configurations are merely examples, and other configurations may be used instead.

The lens barrel 100 is also provided with a movement amount detector 127 and a linear actuator 125 arranged on the inner side of the fixed cylinder 110. The linear actuator 125 drives the guide bar 102 to move in the direction of the optical axis X. The movement amount detector 127 operates when the linear actuator 125 moves the guide bar 102 to detect the movement amount of the guide bar 102 relative to the fixed cylinder 110 in the direction of the optical axis X, and transmits a movement amount signal corresponding to this movement amount to the barrel control section 123.

The barrel control section 123 generates a drive signal that increases or decreases according to the rotation amount signal received from the rotation amount detector 121, and supplies the drive signal to the linear actuator 125. The linear actuator 125 operates according to the drive amount based on the received drive signal to move the guide bar 102 in the direction of the optical axis X. When not operating, the linear actuator 125 does not prevent the guide bar 102 from moving in the direction of the optical axis X.

In this way, the linear actuator 125 linearly drives the guide bar 102. In other words, the guide bar 102 serves as a portion of the drive mechanism when moving the lens L2 to focus the optical system. Therefore, the drive mechanism of the guide bar 102 can be formed without increasing the number of components.

The barrel control section 123 corrects the generated drive signal by referencing the movement amount signal received from the movement amount detector 127. In this way, an error in the movement amount of the guide bar 102 caused by disturbance is corrected so that the lens L2 can move accurately, and the lens barrel 100 can therefore focus quickly and accurately.

The movement amount detector 127 may be formed by a linear scale that moves integrally with the guide bar 102 and an optical sensor that measures the scale. As another example, the movement amount detector 127 may be formed by a magnet that moves with the guide bar 102 and a magnetic sensor that measures the change in the magnetic field caused by the movement of the magnet. These configurations are merely examples, and other configurations may be used instead.

When the lens barrel 100 is focused using an auto-focus system, the rotation operation is not performed on the focus ring 120. In this case, instead of the movement amount of the lens L2 obtained for the focusing of the lens barrel 100, a desired movement amount signal is sent from a control section of the image capturing unit 200. Upon receiving the desired movement amount signal, the barrel control section 123 generates the drive signal based on the desired movement amount and supplies the drive signal to the linear actuator 125.

Figure 2:
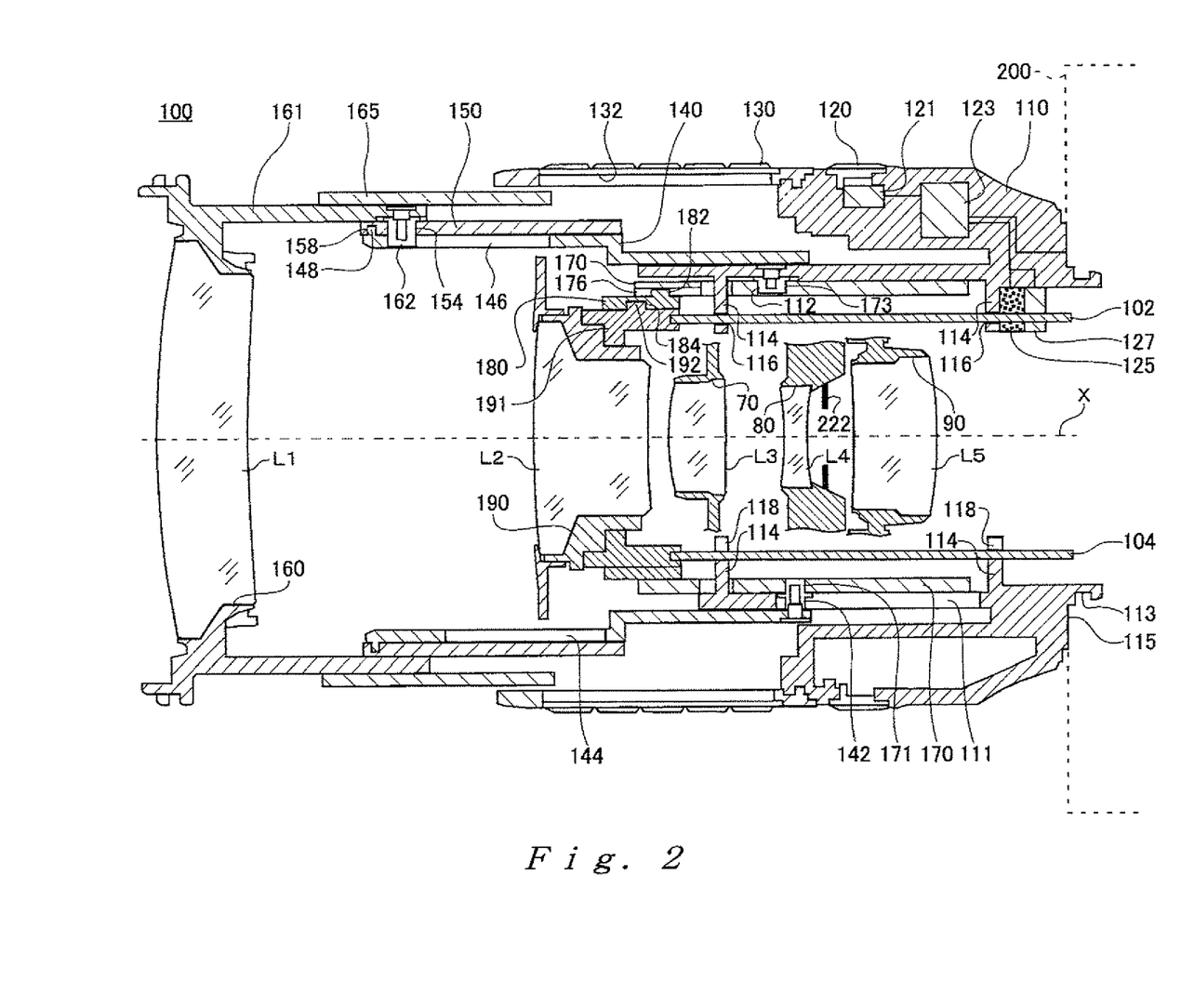
FIG. 2 is a cross-sectional view of the lens barrel 100 scaled as a telephoto lens.

FIG. 2 is a cross-sectional view of the lens barrel 100, in which the lens barrel 100 is scaled as a telephoto lens. Components that are the same as those shown in FIG. 1 are given the same reference numerals, and redundant explanation is omitted. Therefore, the following description deals mainly with the operation of the lens barrel 100.

In FIG. 2, some of the components that are seen in FIG. 1 cannot be seen due to the rotation of these components around the optical axis X. Accordingly, FIG. 1 is referenced as well.

In the lens barrel 100, when the zoom ring 130 undergoes the rotation operation from the outside to rotate around the optical axis X, the rotational drive force is transmitted to the middle cylinder 150 through the cam follower 152 engaged with the guide groove 132. When the middle cylinder 150 rotates, the drive force is transmitted from the cam groove 154 to the cam follower 162 of the outer cylinder 161. Note that, in FIG. 2, the cam follower 152 is cannot be seen due to the rotation.

Upon receiving the drive force, the cam follower 162 is guided by the linear groove 146 of the inner cylinder 140 to move in the direction of the optical axis X. Therefore, the lens frame 160 joined to the tip of the outer cylinder 161 and the lens L1 held by the lens frame 160 move integrally in the direction of the optical axis X.

When the middle cylinder 150 rotates, the rotational drive force is also transmitted to the cam follower 172 engaged with the linear groove 156. Therefore, the cam cylinder 170 rotates around the optical axis X along the inner peripheral surface of the fixed cylinder 110. Note that, in FIG. 2, the linear groove 156 and the cam follower 172 cannot be seen due to the rotation.

When the cam cylinder 170 rotates, the drive force is transmitted to the cam follower 142 engaged with the cam groove 171. The cam follower 142 is guided by the linear groove 111 of the fixed cylinder 110 to move in the direction of the optical axis X. Therefore, the inner cylinder 140 and the middle cylinder 150, which is engaged with the inner cylinder 140 via the engaging groove 158, move in the direction of the optical axis X.

Also, when the cam cylinder 170 rotates, the cam pin 112 of the fixed cylinder 110 engaged with the cam groove 173 is driven, so that the cam cylinder 170 moves in the direction of the optical axis X. Furthermore, when the cam cylinder 170 rotates, the rotational drive force is transmitted to the cam follower 182 of the transfer ring 180 via the linear groove 176.

When the transfer ring 180 is rotationally driven, the drive force is transferred from the cam groove 184 to the cam follower 192 of the connector 191. As a result, the connector 191 is guided by the guide bars 102 and 104 to move in the direction of the optical axis X. Therefore, the lens frame 190 joined to the connector 191 and the lens L2 held by the lens frame 190 move in the direction of the optical axis X.

Here, when the drive force is transmitted from the cam groove 184 to the cam follower 192, it is required that the transfer ring 180 stop moving relative to the fixed cylinder 110 and that the connector 191 move relative to the fixed cylinder 110 in the direction of the optical axis X. Accordingly, the transfer ring 180 generates enough friction with the cam cylinder 170 to cancel out the recoil of the drive force and prevent movement in the direction of the optical axis X.

This friction may be sliding friction between the inner surface of the cam cylinder 170 and the outer surface of the transfer ring 180. However, such friction also causes resistance to the rotational operation of the cam cylinder 170. Therefore, this friction is desirably generated by increasing the sliding friction between the linear groove 176 and the cam follower 182. Instead, an electromagnetic transducer or the like including a piezoelectric material may be used as a clutch component to temporarily increase the sliding resistance of the cam follower 182 relative to the linear groove 176.

When the rotation operation is performed on the zoom ring 130, the lens L1 moves due to the movement of the outer cylinder 161. In the zoom operation of the lens barrel 100, the other lenses L3, L4, and L5 move such that the intervals therebetween change. As a result of this series of operations, the lens barrel 100 extends or contracts to change the intervals between the lenses L1, L2, L3, L4, and L5, thereby changing the focal distance of the entire optical system.

The other lenses L3, L4, and L5 only need to move when the lens barrel 100 is scaling, and so a known drive mechanism can be used. In other words, the lens frames 70, 80, and 90 may move while being guided by cam grooves and linear grooves formed in the cam cylinder 170 and the fixed cylinder 110. As another example, the guide bars 102 and 104 may be used to guide the lens frames 70, 80, and 90.

A cover cylinder 165 disposed coaxially to the fixed cylinder 110 is provided between the outer cylinder 161 and the zoom ring 130. The cover cylinder 165 moves forward and backward together with the outer cylinder 161, and seals the space between the outer cylinder 161 and the zoom ring 130. As a result, dust is prevented from entering into the lens barrel 100.

Figure 3:
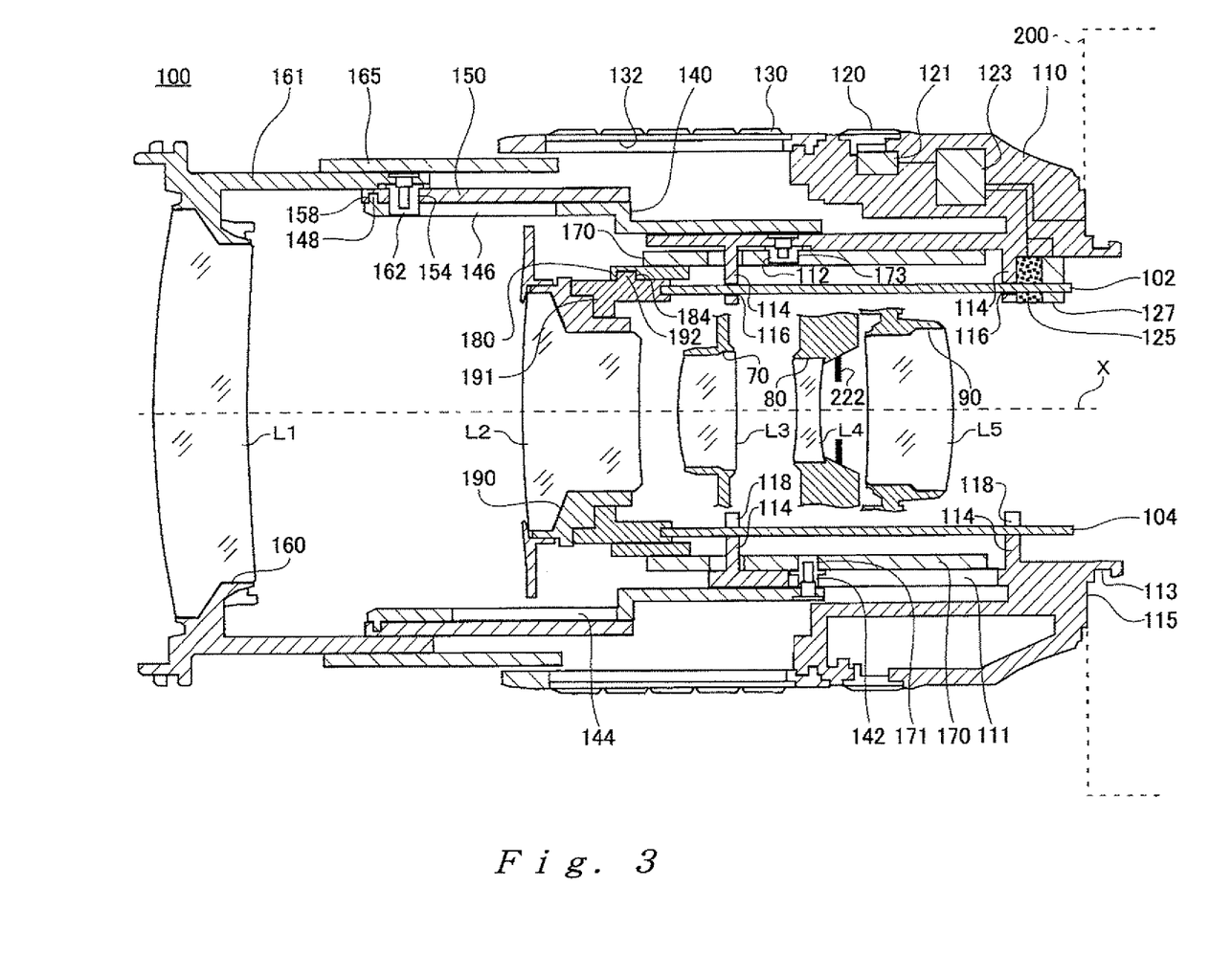
FIG. 3 is a cross-sectional view showing focusing of the lens barrel 100.

FIG. 3 is a cross-sectional view showing the focusing of the lens barrel 100, and is based on FIG. 2. Components that are the same as those in FIGS. 1 and 2 are given the same reference numerals, and redundant explanations are omitted.

When the focus ring 120 is rotated and the rotation amount signal is sent form the rotation amount detector 121 or the desired movement amount signal indicating the desired movement for focusing is sent from the image capturing unit 200, the rotation amount signal or the desired movement amount signal are received by the barrel control section 123, which then generates a drive signal and supplies the drive signal to the linear actuator 125.

As a result, the linear actuator 125 moves the guide bar 102 in the direction of the optical axis X. Here, the linear actuator 125 transmits to the guide bar 102 a drive force sufficient for overcoming the friction between the cam cylinder 170 and the transfer ring 180 and moving the transfer ring 180.

When the linear actuator 125 operates to move the guide bar 102, the connector 191 joined to the guide bar 102, the guide bar 104 and the lens frame 190 formed integrally with the connector 191, and the lens L2 held by the lens frame 190 move in the direction of the optical axis X. As a result, the optical system of the lens barrel 100 focuses.

At this time, the transfer ring 180 engaged via the cam groove 184 to the cam follower 192 of the connector 191 moves together with the connector 191 in the direction of the optical axis X. However, the cam follower 182 of the transfer ring 180 moves in the direction of the optical axis X within the linear groove 176 of the cam cylinder 170, and therefore does not transmit drive force to the cam cylinder 170.

Therefore, drive force is not transferred from the transfer ring 180 to the cam cylinder 170, the inner cylinder 140, the middle cylinder 150, and the like. Accordingly, the lenses other than L2, i.e. lenses L1, L3, L4, and L5, do not move, and so the focal distance of the optical system of the lens barrel 100 does not change.

Figure 4:
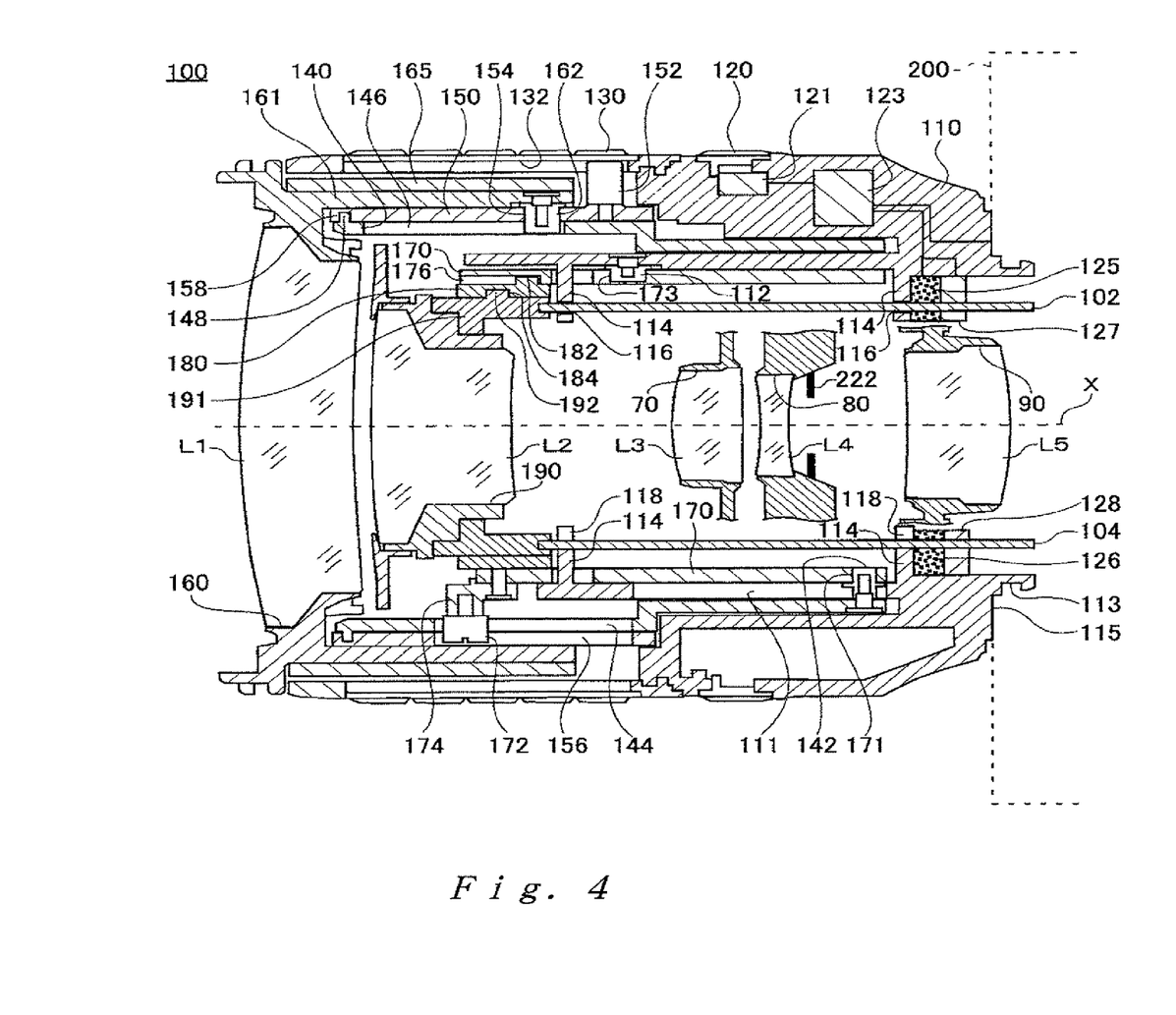
FIG. 4 is a cross-sectional view of another configuration of the lens barrel 100.

FIG. 4 is a cross-sectional view of another configuration of the lens barrel 100. Aside from the differences described below, this lens barrel 100 has the same configuration as the lens barrel 100 described in FIGS. 1 and 2. Therefore, components that are the same as those shown in FIGS. 1 and 2 are given the same reference numerals, and redundant explanation is omitted.

In addition to the linear actuator 125 through which the guide bar 102 is inserted, this lens barrel 100 further includes a linear actuator 126 through which the guide bar 104 is inserted and a movement amount detector 128. This additional linear actuator 126 operates in parallel with the known linear actuator 125. In other words, the linear actuator 126 controls the barrel control section 123 simultaneously with the linear actuator 125, and so the linear actuator 126 operates or stops at the same time that the linear actuator 125 operates or stops.

At this time, the guide bars 102 and 104 drive the top end and the bottom end of the lens frame 190 simultaneously, so that the lens L2 can move smoothly. The linear actuators 125 and 126 operate simultaneously to drive the guide bars 102 and 104. As a result, the lens frame 190 holding the lens L2 is driven simultaneously at both top and bottom ends in FIG. 4 to move smoothly.

When the linear actuators 125 and 126 are not operating, these linear actuators do not impede the movement of the guide bars 102 and 104 in the direction of the optical axis X. Therefore, when the middle cylinder 150, the cam cylinder 170, and the transfer ring 180 rotate in response to the rotation operation being performed on the zoom ring 130, the drive force transmitted from the cam groove 184 to the cam follower 192 causes the connector 191, the lens frame 190, and the lens L2 to move together in the direction of the optical axis X.

The above example describes a case in which the pair of linear actuators 125 and 126 operate and stop simultaneously. However, by operating each linear actuator 125 and 126 independently, the inclination of the lens frame 190 and the lens L2 relative to the optical axis X can be changed. Therefore, characteristics of an optical system caused by inclination of the lens L2 can be compensated for using these linear actuators 125 and 126.

Figure 5:
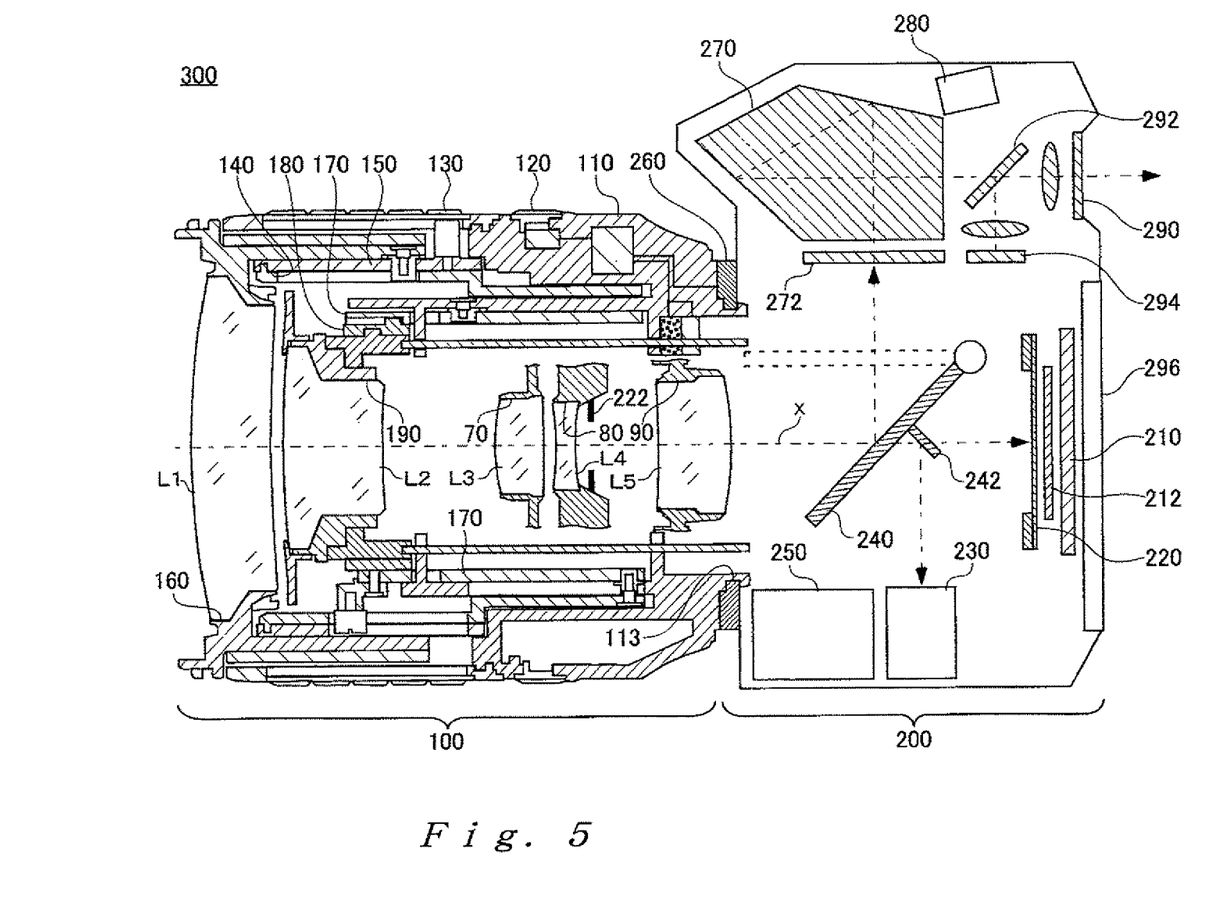
FIG. 5 is a schematic cross-sectional view of a camera system 300.

FIG. 5 is a schematic view of a camera system 300 provided with the lens barrel 100. In order to prevent FIG. 5 from being overly complex, the lens barrel 100 is shown schematically. However, the lens barrel 100 shown in FIG. 5 has the same configuration as any one of the lens barrels 100 described in FIGS. 1 to 3. Therefore, components that are the same as those in FIGS. 1 to 3 are given the same reference numerals and redundant explanation is omitted.

The camera system 300 includes the lens barrel 100 and an image capturing unit 200. The lens barrel 100 is detachably mounted on a mount section 260 of the image capturing unit 200.

The lens barrel 100 mounted in the camera system 300 is electrically connected to the image capturing unit 200 via connection terminals, not shown. In this way, the lens barrel 100 receives power from the image capturing unit 200. Furthermore, signals are transmitted from the lens barrel 100 to the image capturing unit 200.

The image capturing unit 200 houses a main control section 250 and an optical system that includes a main mirror 240, a pentaprism 270, and an ocular optical system 290. The main mirror 240 moves between a standby position, in which the main mirror 240 is oriented diagonally in the optical path of incident light through the optical system of the lens barrel 100, and an image capture position, which is shown by the dotted line in FIG. 5 and in which the main mirror 240 is raised out of the optical path of the incident light.

When in the standby position, the main mirror 240 guides a majority of the incident light to a focusing screen 272 arranged thereabove. The focusing screen 272 is arranged at a position to form an image when the optical system of the lens barrel 100 is focused, and causes this image to be visible.

The image formed by the focusing screen 272 can be seen from the ocular optical system 290 via the pentaprism 270. Therefore, the image on the focusing screen 272 can be seen as a normal image from the ocular optical system 290.

A half mirror 292 is arranged between the pentaprism 270 and the ocular optical system 290. The half mirror 292 superimposes the display image formed by the finder LCD 294 onto the image of the focusing screen 272. As a result, the image seen at the output end of the ocular optical system 290 is a combination of the image of the focusing screen 272 and the image of the finder LCD 294. The finder LCD 294 displays information concerning image capturing conditions, setting conditions, and the like of the camera system 300.

A portion of the light output from the pentaprism 270 is guided to the photometric unit 280. The photometric unit 280 measures the intensity of the light and a distribution or the like thereof, and these measurement results are referenced when determining the image capturing conditions.

The back surface of the main mirror 240, which is opposite the incident surface that receives the incident light, has a secondary mirror 242. The secondary mirror 242 guides a portion of the incident light passing through the main mirror 240 to a focal point detection apparatus 230 positioned therebelow. Therefore, when the main mirror 240 is in the standby position, the focal point detection apparatus 230 detects a focal adjustment state of the optical system. When the main mirror 240 moves to the image capture position, the secondary mirror 242 also moves out of the optical path of the incident light.

A shutter 220, an optical filter 212, and an image capturing element 210 are arranged on the optical axis behind the main mirror 240 relative to a direction of the incident light from the lens barrel 100. When the shutter 220 is open, the main mirror 240 moves to the image capture position immediately therebefore, and so the incident light progresses to be incident to the image capturing element 210. As a result, the image formed by the incident light is converted into an electric signal by the image capturing element 210.

The image capturing unit 200 is provided with a main LCD 296 facing outward on a back surface of the lens barrel 100. The main LCD 296 displays various types of setting information concerning the image capturing unit 200, and also displays the image formed by the image capturing element 210 when the main mirror 240 is in the image capture position.

The main control section 250 performs overall control of the various operations described above. Furthermore, an auto-focus mechanism can be formed that drives the lens barrel 100 while referencing information concerning the distance to a subject as detected by the focal point detection apparatus 230 of the image capturing unit 200. As another example, an auto-focus mechanism can be formed by the focal point detection apparatus 230 referencing the movement amount of the lens barrel 100, The main control section 250 also controls the opening and closing of a diaphragm apparatus 222 by exchanging information with a microprocessor of the lens barrel 100. The main control section 250 also provides automatic exposure, scene mode execution, bracket image capturing, or the like.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. A lens barrel comprising:
   an optical system including an optical component that moves relative to a fixed cylinder;
   a holding frame that holds the optical component;
   a guide axle that is connected to the holding frame and that extends parallel to an optical axis of the optical system, wherein the guide axle is movable relative to the fixed cylinder along a substantially straight path in a direction of the optical axis and the guide axle guides the holding frame in the direction of the optical axis;
   a first drive unit that can move relative to the fixed cylinder and that moves the holding frame in the direction of the optical axis when the optical system scales; and
   a second drive unit that has at least a portion thereof fixed to the fixed cylinder and that moves the guide axle relative to the fixed cylinder along the substantially straight path in the direction of the optical axis.

2. The lens barrel according to claim 1, wherein a portion of the second drive unit is formed on the guide axle.

3. The lens barrel according to claim 1, wherein the first drive unit includes:
   a drive ring that has one of a linear groove extending in the direction of the optical axis and an interlocking pin that engages with the linear groove, and that rotates around the optical axis; and
   an interlocking ring that is rotationally driven around the optical axis by the other of the linear groove and the interlocking pin, and
   the holding frame and the interlocking ring are engaged to each other via a cam groove that is diagonal to the optical axis and a cam pin that is engaged with the cam groove.

4. The lens barrel according to claim 3, wherein the holding frame has the cam pin provided thereon in a manner to protrude from an outer peripheral side of the holding frame, and
   the interlocking ring has the interlocking pin provided thereon in a manner to protrude from an outer peripheral side of the interlocking ring.

5. The lens barrel according to claim 4, wherein one of the cam pin and the interlocking pin is arranged near the guide axle in a circumferential direction of the optical component.

6. The lens barrel according to claim 1, comprising:
   an operation ring that can be operated from outside the lens barrel to rotate around the optical axis; and
   a rotation detector that detects a rotation amount of the operation ring, wherein
   the second drive unit moves the guide axle in the direction of the optical axis according to the rotation amount detected by the rotation detector.

7. The lens barrel according to claim 1, comprising:
   a linear motion detector that detects a movement amount of the guide axle by the second drive unit; and
   a control section that controls the second drive unit according to a detection result of the linear motion detector.

8. An image capturing apparatus comprising:
   the lens barrel according to claim 1; and
   an image capturing unit that records an image formed by the lens barrel.

9. A method of manufacturing a lens barrel comprising:
   providing an optical system including an optical component such that the optical component is movable relative to a fixed cylinder;
   providing a holding frame for holding the optical component;

providing a guide axle for guiding the holding frame in a direction of an optical axis of the optical system;

connecting the guide axle to the holding frame such that the guide axle extends parallel to the optical axis and is movable relative to the fixed cylinder along a substantially straight path in a direction of the optical axis;

providing a first drive unit such that the first drive unit is movable relative to the fixed cylinder and can move the holding frame in the direction of the optical axis; and fixing at least a portion of a second drive unit to the fixed cylinder such that the second drive unit can move the guide axle and the holding frame relative to the fixed cylinder along the substantially straight path in the direction of the optical axis.

10. The method according to claim 9, wherein
a portion of the second drive unit is formed on the guide axle.

11. The method according to claim 9, wherein
the first drive unit includes:
a drive ring that has one of a linear groove extending in the direction of the optical axis and an interlocking pin that engages with the linear groove, and that rotates around the optical axis; and
an interlocking ring that is rotationally driven around the optical axis by an other of the linear groove and the interlocking pin, and
the holding frame and the interlocking ring are engaged to each other via a cam groove that is diagonal to the optical axis and a cam pin that is engaged with the cam groove.

12. The method according to claim 11, wherein
the holding frame has the cam pin provided thereon in a manner to protrude from an outer peripheral side of the holding frame, and
the interlocking ring has the interlocking pin provided thereon in a manner to protrude from an outer peripheral side of the interlocking ring.

13. The method according to claim 12, wherein
one of the cam pin and the interlocking pin is arranged near the guide axle in a circumferential direction of the optical component.

14. The method according to claim 9, further comprising:
providing an operation ring such that the operation ring can be operated from outside the lens barrel to rotate around the optical axis; and
providing a rotation detector for detecting a rotation amount of the operation ring, wherein
the second drive unit moves the guide axle in the direction of the optical axis according to the rotation amount detected by the rotation detector.

15. The method according to claim 9, further comprising:
providing a linear motion detector for detecting a movement amount of the guide axle by the second drive unit; and
providing a control section for controlling the second drive unit according to a detection result of the linear motion detector.

16. A method of manufacturing an image capturing apparatus comprising:
providing the lens barrel manufactured by the method according to claim 9; and
providing an image capturing unit for recording an image formed by the lens barrel.

* * * * *